United States Patent
Burghouts et al.

(10) Patent No.: US 10,929,688 B2
(45) Date of Patent: Feb. 23, 2021

(54) SYSTEM AND METHOD OF VIDEO CONTENT FILTERING

(71) Applicant: Nederlandse Organisatie voor toegepast-natuurwetenschappelijk onderzoek TNO, s-Gravenhage (NL)

(72) Inventors: Gerardus Johannes Burghouts, Edam-Volendam (NL); Victor Leonard Westerwoudt, Rotterdam (NL); Klamer Schutte, Zoetermeer (NL)

(73) Assignee: Nederlandse Organisatie voor toegepast-natuurwetenschappeliik onderzoek TNO, 's-Gravenhage (NL)

( * ) Notice: Subject to any disclaimer, the term of this patent is extended or adjusted under 35 U.S.C. 154(b) by 0 days.

(21) Appl. No.: 16/470,036

(22) PCT Filed: Dec. 15, 2017

(86) PCT No.: PCT/NL2017/050840
§ 371 (c)(1),
(2) Date: Jun. 14, 2019

(87) PCT Pub. No.: WO2018/111105
PCT Pub. Date: Jun. 21, 2018

(65) Prior Publication Data
US 2020/0012866 A1    Jan. 9, 2020

(30) Foreign Application Priority Data
Dec. 15, 2016   (EP) .................................. 16204474

(51) Int. Cl.
*H04N 7/16*         (2011.01)
*G06K 9/00*         (2006.01)
(Continued)

(52) U.S. Cl.
CPC ..... *G06K 9/00771* (2013.01); *G06K 9/00718* (2013.01); *G06K 9/00744* (2013.01);
(Continued)

(58) Field of Classification Search
CPC . H04N 21/8549; G06F 16/739; G06F 16/786; G06K 9/00718
See application file for complete search history.

(56) References Cited

U.S. PATENT DOCUMENTS 9,183,247 B2 *  11/2015  Priyadarshan .......... G06F 16/24
2012/0076357 A1 *  3/2012  Yamamoto ........... H04N 21/233
                                                          382/103
(Continued)

OTHER PUBLICATIONS

Cuneyt M. Taskiran et al, Automated Video Program Summarization Using Speech Transcripts, Aug. 2006, IEEE, vol. 8, No. 4 (Year: 2006).*

(Continued)

*Primary Examiner* — Gigi L Dubasky
(74) *Attorney, Agent, or Firm* — Banner & Witcoff, Ltd.

(57) ABSTRACT

An input video sequence from a camera is filtered by a process that comprises detecting temporal tracks of moving image parts from the input video sequence and assigning activity scores to temporal segments of the tracks, using respective predefined track dependent activity score functions for a plurality of different activity types. Based on this, event scores for are computed as a function of time. This computation is controlled by a definition of a temporal sequence of activity types or compound activity types for an event type. Successive intermediate scores are computed, each as a function of time for a respective activity types or compound activity types in the temporal sequence. The successive intermediate scores for each respective activity types or compound activity are computed from a combination of the intermediate score for a preceding activity type or
(Continued)

compound activity type in the temporal sequence at a preceding time and activity scores that were assigned to segments of the tracks after the preceding time, for the activity type or activity types defined by the compound activity type defined by the respective activity types or compound activity types in the temporal sequence. One of the computed event scores for a selected time. The computation of the selected event score is traced back to identify intermediate scores that were used to compute the selected one of the event scores and to identify segments of the tracks for which the assigned activity scores were used to compute the identified intermediate scores. An output video sequence and/or video image is generates that selectively includes the image parts associated with the selected segments.

12 Claims, 10 Drawing Sheets

(51) Int. Cl.
*G06K 9/32* (2006.01)
*G06K 9/62* (2006.01)
*H04N 21/8549* (2011.01)

(52) U.S. Cl.
CPC ......... *G06K 9/3241* (2013.01); *G06K 9/6276* (2013.01); *H04N 21/8549* (2013.01); *G06K 2009/00738* (2013.01)

(56) References Cited

U.S. PATENT DOCUMENTS

| | | | | |
|---|---|---|---|---|
| 2013/0282747 | A1* | 10/2013 | Cheng | G06F 16/78 707/758 |
| 2014/0105573 | A1* | 4/2014 | Hanckmann | H04N 5/91 386/241 |
| 2014/0211987 | A1 | 7/2014 | Fan et al. | |
| 2016/0014482 | A1 | 1/2016 | Chen et al. | |
| 2016/0105617 | A1 | 4/2016 | Kirkby et al. | |
| 2016/0247328 | A1* | 8/2016 | Han | H04N 21/4394 |
| 2017/0109586 | A1* | 4/2017 | Rana | G06K 9/00335 |

OTHER PUBLICATIONS

A. Fernández-Caballero, J.C. Castillo, J.M. Rodríguez Sánchez, "Human activity monitoring by local and global finite state machines", Expert Syst. Appl. 39, 6982-6993, 2012.

G. Sanromà, L. Patino, G.J. Burghouts, K. Schutte, J. Ferryman, "A unified approach to the recognition of complex actions from sequences of zone-crossings", Image and Vision Computing 32, 363-378, 2014.

D.P. Barrett, A. Barbu, N. Siddharth, and J.M. Siskind, "Saying What You're Looking For: Linguistics Meets Video Search", IEEE Transactions on Pattern Analysis and Machine Intelligence (PAMI), 28(10), 2069-2081, 2016.

J. Xiao, H. Cheng, H. Sawhney, F. Han, "Vehicle Detection and Tracking in Wide Field-of-View Aerial Video", IEEE CVPR, 2010.

I. Laptev, T. Lindeberg, "Space-time interest points", IEEE International Conference on Computer Vision, vol. 1, 2003, pp. 432-439, 2003.

L.J.P. van der Maaten and G.E. Hinton, "Visualizing High-Dimensional Data Using t-SNE", Journal of Machine Learning Research 9, 2579-2605, 2008.

G. Burghouts, K. Schutte, H. Bouma, R. Hollander, "Selection of negative samples and two-stage combination of multiple features for action detection in thousands of videos", Mach. Vis. Appl., 1-14, 2013.

H. Bouma, J. Baan, S. Landsmeer, C. Kruszynski, G. van Antwerpen, J. Dijk, "Real-time tracking and fast retrieval of persons in multiple surveillance cameras of a shopping mall", Proc. SPIE, vol. 8756, 2013.

R. den Hollander, H. Bouma, J. Baan, P. Eendebak, J. van Rest, "Automatic inference of geometric camera parameters and inter-camera topology in uncalibrated disjoint surveillance cameras", Proc. SPIE, vol. 9652, 2015.

Mittelstadt et al., "The Ethics of Algorithms: Mapping the Debate", Big Data & Society, Dec. 1, 2016.

Cristani et al., "Socially Intelligent Surveillance and Monitoring: Analysing Social Dimensions of Physical Space", IEEE 2010.

Jul. 3, 2018—International Search Report and Written Opinion—Appl. No. PCT/NL2017/050840.

C.M. Taskir et al: "Automated video program summarization using speech transcripts", IEEE Transactions on Multimedia., vol. 8, 4, Aug. 1, 2006 (Aug. 1, 2006), pp. 775-791, XP055297525, US.

* cited by examiner

SYSTEM AND METHOD OF VIDEO CONTENT FILTERING

CROSS-REFERENCE TO RELATED APPLICATIONS

This application is a U.S. National Stage application under 35 U.S.C. § 371 of International Application PCT/NL2017/050840 (published as WO 2018/111105 A1), filed Dec. 15, 2017, which claims the benefit of priority to Application EP 16204474.7, filed Dec. 15, 2016. Each of these prior applications is hereby incorporated by reference in its entirety.

FIELD OF THE INVENTION

The invention provides for a system and method of video content filtering, for example for automatically generating marked up video data or images from a video sequence.

BACKGROUND

WO2013036129 describes a video surveillance system that classifies activities that are visible in a video sequence. The classification is based on predefined rules of behavior for different types of activities, such as moving to a target position, throwing an object, following a person. Each rule defines aspects of motion of one or more actors involved in the activities and other conditions that will be met if the actors act according to the rule. In WO2013036129 the classification involves detection of position and motion of actors that are visible in the video sequence. For all rules and each possible assignment of actors to roles in the rule it is tested whether the rule is satisfied. This may be done by testing the conditions for the assigned actor or actors and computing a score value that measure how much the detected motion of the assigned actor or actors deviates from the motion predicted according to the rule. The score value may be compared with a threshold to determine whether the rule is satisfied.

When a rule is found to be satisfied a signal is generated, e.g. to inform a human supervisor that the video sequence shows a specific form of behavior. This enables the guard to direct his or her attention to the scene shown by the video sequence. However, even after receiving information that a type of behavior has occurred, it may still be cumbersome for the guard to evaluate events shown in the video sequence. Moreover, although comparison of a detected and predicted motion vector of an actor at individual time points may suffice for detection, it is desirable that longer tracks of the actors can be made useful for detection. This can be done by applying supervised classifier training to tracks. But this requires collection and manual labeling of example video sequences for diverse and even unusual forms of expression of types of behavior.

SUMMARY

It is an object to provide for a method of filtering an input video sequence captured by a camera, by which selection of parts of the input video sequence can be automatically controlled.

A method of filtering an input video sequence captured by a camera is provided, the method comprising
  detecting temporal tracks of moving image parts from the input video sequence;
  assigning activity scores to temporal segments of the tracks, using respective predefined track dependent activity score functions for a plurality of different activity types;
  computing event scores as a function of time, said computing being controlled by a definition of a temporal sequence of activity types or compound activity types for an event type, said computing of the event scores comprising computing successive intermediate scores, each as a function of time for a respective activity types or compound activity types in the temporal sequence, the event score corresponding to the intermediate score of a final activity types or compound activity type of the temporal sequence, the successive intermediate scores for each respective activity types or compound activity types being computed as a function of time from a combination of
    the intermediate score for a preceding activity type or compound activity type in the temporal sequence at a preceding time and
    activity scores that were assigned to segments of the tracks after the preceding time, for the activity type or activity types defined by the compound activity type defined by the respective activity types or compound activity types ill the temporal sequence,
  selecting one of the computed event scores for a selected time;
  tracing back the computation of the selected event score to identify intermediate scores that were used to compute the selected one of the event scores and to identify segments of the tracks for which the assigned activity scores were used to compute the identified intermediate scores;
  generating an output video sequence and/or video image selectively including the image parts associated with the selected segments. The steps of the method are executed by a programmable processing system.

The method involves selection of temporal segments of detected tracks of objects that move in the input video sequence. Track segments of predetermined temporal length of, say, one to five seconds may be used. Usually, there will be many such track segments, especially when the input video sequence has a much larger length. The filtering produces a selection from these many short track segments based on longer time scale information. This is realized by tracing back a compound computation of an event score that is based on a definition of a temporal sequence of different activities or compound activities. Tracing back serves to determine which of the plurality of previous computations of scores from different segments, activities, compound activities and partial (intermediate) events contributed to the selected event score and which not.

Different definitions of a temporal sequence of activity types or compound activity types are provided for different event types. From the same input video sequence event scores for a plurality of different event types may be computed according to this method. In the selecting step, any of these event scores may be selected in order to select filtering in different ways, each particular to a different event type. A user may select the event score(s) for an event type or types in which the user has a particular interest, or which has the highest score. In an embodiment an automatic selection or preselection may be made based on the event scores, selecting only the highest event score that has been determined or a set of event scores that for which higher event scores than a threshold have been determined, or than for any other event types.

Based on the filtering an output video sequence and/or video image is generated that selectively includes the image parts associated with the selected segments in the sense that the generated output video sequence and/or video image includes these image parts but not all other image parts of the original sequence or image.

This approach makes it easier for a user to control filtering. In an embodiment, control by a user programmable model in terms of activities may be combined with example based automated training of score function computation from track segments.

BRIEF DESCRIPTION OF THE DRAWING

These and other objects and advantageous aspects will become apparent from a description of exemplary embodiments with reference to the following drawing, in which.

DETAILED DESCRIPTION OF EXEMPLARY EMBODIMENTS

Figure 1:
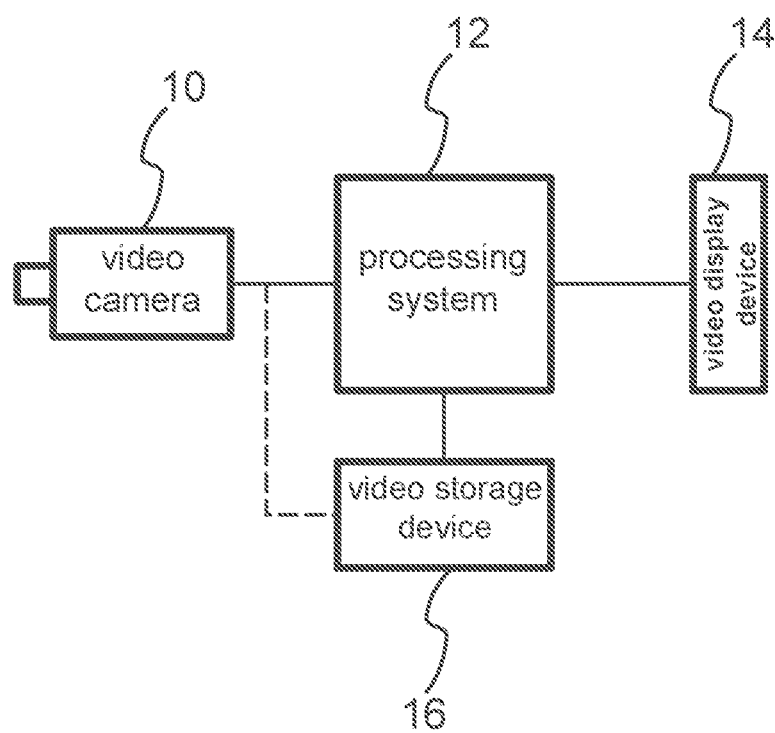
FIG. 1 shows an exemplary video surveillance system

FIG. 1 shows an exemplary video surveillance system, comprising a video camera 10, a processing system 12 and a video display device 14 and an optional video storage device 16, wherein the processing system 12 has an input coupled to a camera and an output coupled to display device 14. The processing system 12 may have input/outputs coupled to video storage device 16. Video camera 10 may have an output coupled to video storage device 16. Although direct connections are shown, it should be appreciated that network communication connections may be used between part or all of the components shown in FIG. 1.

Processing system 12 comprises a computer program for causing display device 14 to display a mark-up version of an input video sequence received from video camera 10, wherein selected parts of the input video sequence are indicated that have been detected to correspond to specific predefined types of events performed by actors, e.g. persons or animals, that are visible in the input video sequence. The selected parts may be parts of video images in the input video sequence for example.

As used herein, a mark-up version of an input video sequence may comprise the input video sequence with added information in the images of the video sequence that indicates selected parts of the input video sequence, but the term mark-up version of a video sequence also covers an image that contains selected parts of images from the input video sequence, without comprising the whole input video sequence, or an output video sequence with image data from the input video sequence, without comprising the whole input video sequence.

To select parts of the input video sequence, the processing system 12 computes scores for one of more predefined types of event as a function of time, using a compound score computation that starts from detected track segments in the input video sequence. The processing system 12 selects one or more time points and/or event types based on the computed scores, for example by selecting a time point that results in a score that exceeds a predetermined threshold and is larger than any other of the scores computed for a time interval of predetermined length. Subsequently, the processing system 12 uses the compound score computation in reverse to identify which of the detected track segments gave rise to the computed score for the selected time point and/or type of event. The processing system 12 uses these identified track segments to select parts of the input video sequence and generates an image or an output video sequence wherein the select parts are indicated.

The method makes use of temporal tracks of moving image parts and segments of such temporal tracks, which are also referred to simply as track (segments). Each temporal track (segment) is representation of the position of a moving image part in series of temporally successive images.

The method makes use of predetermined activity types, i.e. labels of different types of motion such one directional motion, cyclically repeating motion direction changes, up and/or down motion etc. Furthermore, the method makes use of compound activity types, i.e. labels for sets of concurrent activities. The method also makes use of "events". i.e. predefined temporal sequences of (compound) activity types.

Furthermore, the method makes use of activity scores for a track segment, also referred to as activity type scores, i.e. different score values associated with a track segment for different activity types. Different functions of properties of the track segments, each function for a respective different activity type, may be used to compute the activity type scores for a segment for the different activity types. Predefined track dependent activity score functions are predefined functions for computing activity scores from the track and different track dependent activity score functions for different activity types are provided to compute a plurality of activity scores from the track for respective different activity types.

Furthermore, the method makes use of event scores as a function of time. The computation of event scores is dependent on the event type, in that the computation is controlled by the temporal sequence of activity types or compound activity types defined for the event type. These activity types determine which activity scores must be used in the computation of the event score, i.e. the scores computed with the activity functions for these activity types.

Figure 2:
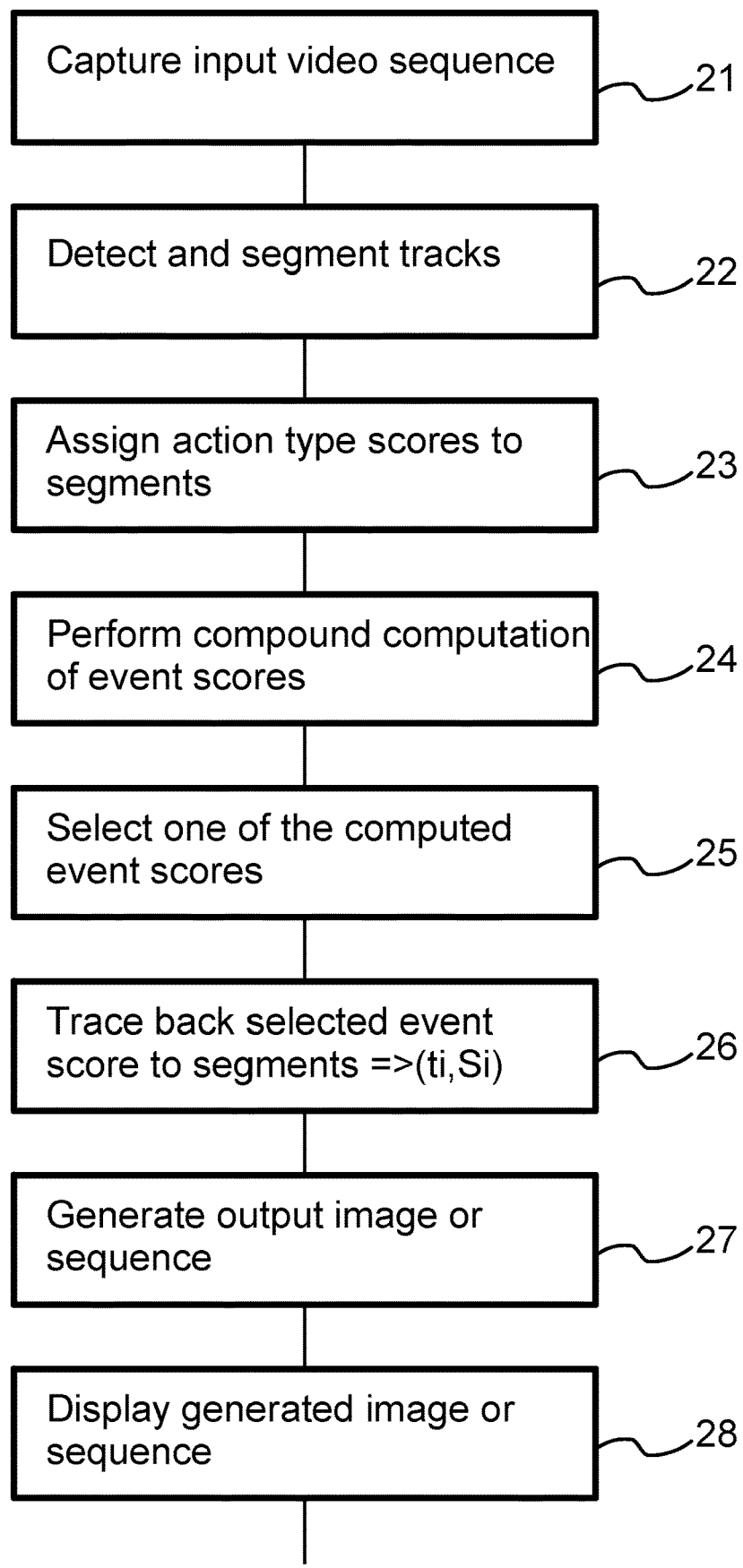
FIG. 2 shows a flow chart of a method of automatically marking up video data

FIG. 2 shows a flow chart of the computer program for automatically generating a mark-up version of an input video sequence, as executed by processing system 12. In a first step 21, processing system 12 captures a temporal series of images of the input video sequence. The images may be captured directly form a connection to video camera 10, or indirectly, e.g. from a storage device on which the input video sequence has been stored. In a second step 22, processing system 12 detects temporal tracks of features that are visible in the input video sequence. Image feature detection and tracking are known per se. Each detected temporal track may be represented as a temporal series of feature positions and/or motion vectors as a function of time. In addition, each temporal track may be associated with a moving image part of the video images (a moving area op pixels) that shows an object that moves along the track. Such a moving image part will be referred to as the object of the track. The detected temporal tracks need not extend form the beginning to the end of the video sequence. A feature may enter and/or leave the images during the sequence and its overall track may be fragmented into discrete temporal tracks due to detection errors or occlusion.

In second step 22, processing system 12 furthermore segments the detected temporal tracks into temporal track segments. Segments op predetermined temporal length (e.g. a length between 1-5 seconds) may be used. Like the temporal track, the temporal track segments may be associated with a moving part of the video images that forms an object of the track segment. Optionally, processing system 12 may associate each segment with an identifier of such a moving part, using the same identifiers for segments starting at different time points when the segments are segments of the track of the same moving part.

In a third step 23, processing system 12 assigns activity type scores for one or more different activity types to each segment. In an embodiment the assignment of such activity scores may come down to assigning one or more activity type indications to each the segment of the tracks. Such an assignment may be regarded as an assignment of one of two score values only (corresponding to assignment and no assignment of a type indication). But preferably scores values from a larger range, such as a quasi continuous range are assigned.

Activity types from a predetermined set of activity type indications may be used. By way of example such a set may contain activity types corresponding to substantially one directional motion, cyclically repeating motion direction changes, up and/or down motion, a sudden increase or onset of motion, a sudden decrease or disappearance of motion, absence of motion and motion that does not come under the other types (random motion). Different types may also distinguish different motion amplitudes. In addition to motion dependent activity types, position dependent activity types may be used, such as presence of the track in a predetermined area. Position and motion dependent activity types may be used wherein different motion based type may be combined, such as cyclically repeating motion in a predetermined area.

Any method of computing the activity scores for the different activity types for the segment may be used. Although some computing methods may be programmed functions of properties of the track segments, it is preferred that at least for part of the activity types parameters of the computing methods for computing the activity scores are trained by providing training examples of tracks showing different activity types. In contrast to compound events, for which it may be difficult to obtain sufficient training video sequences to train score function computations, it is easy to obtain large numbers of track segments that enable automated training of score computations that are specific to different activities. Thus a combination of user definition of an event model and automated training of score computation for different activity types from track segments makes it feasible to realize reliable score function computation for compound events that involve sequences of activities.

For example a set of reference tracks may be provided for an activity type, and measures of difference between the track in the segment and the reference tracks may be computed in order to derive the score value, e.g. by using the lowest of the measures computed with the different reference tracks. The set of set of reference tracks may consist of examples of tracks or track segments from tracks that are provided as training examples, or selected reference tracks obtained for example by clustering and selecting reference tracks for clusters, or eliminating redundant examples etc. The score value may be computed by applying a predetermined function to such a measure of difference. Preferably a function is used that limits the range of score values a range including only zero and larger values. The measure of difference may be computed from a sum of squares of differences between motion vectors and/or positions as a function of time for example, from a correlation coefficient between the motion vectors as a function of time etc. Any other discrimination score computation training methods, such as by applying an automated score function computation training algorithm to the training examples. Examples of score function computation training algorithm are genetic algorithms, perceptron or neural network training algorithms, Bayesian statistics training methods, hidden Markov model training methods etc.

As another example the measure of difference may be computed by histogram comparison of histograms of motion vectors and/or positions in the segments and reference tracks. But use of reference tracks and a measure of difference is not indispensable for computing the score.

Alternatively, predefined functionals of the tracks may be used to compute the score, such as a variance of the motion vector or motion vector direction for computing a score for substantially one directional motion, spectral power content in a predetermined frequency band of a Fourier transform of the motion vectors etc. (A functional is a function of a (quasi-) continuous sequence of values).

Compound Computation of Event Scores

In a fourth step 24, processing system 12 performs a compound computation for computing event scores for predetermined events from the assigned activity type indications or activity type scores. For this purpose processing system 12 makes use of one or more predefined event models.

An embodiment of the predefined event model E takes the form an event model E defines a temporal sequence of compound activity types C1, C2, and a maximum time duration T.

$$E=(\{C1;C2;\ldots Cn\},T)$$

In turn, the model defines for each compound activity type Ci a sub-set Ai1, Ai2, . . . of the activity types and a time duration Ti $$Ci=([Ai1,Ai2,\ldots Ain],Ti)$$

This represents that activities of the activity types defined by the sub-set must be performed concurrently. The sub-set may consist of one activity type. In a simplified embodiment of the model, only sub-sets containing a single activity type are used, so that the compound activity type coincides with an activity type.

Optionally the event model also defines a one or more actor roles and associates each activity type with one of these actor roles. When different activities in the event model are associated with the same actor role, this requires that the track segments corresponding to the activities are expected to be part of the track of the same object in the video sequence.

Processing system 12 uses one or more of such predefined event models to control a compound computation of scores for one or more events as a function of time. Processing system 12 computes the score for an event E at a time t from a score p(Cn,t) for the final compound activity type Cn of the event model for the event. Processing system 12 computes scores p(Ci,t) for compound activity type Ci (i=1 . . . n) in the sequence defined for the model, each, except C1, for times t from the score p(Ci−1,ti−1) of the preceding compound activity type Ci−1 at a preceding time ti−1 and the scores for the track segments in the time interval [ti−1, ti]. For C1 a default score value takes the place of the score of the preceding compound activity type. The scores p(Ci,t) if i<n will each also be referred to as an intermediate score and p(Ci,t) for i=n will also be referred to as the final (event) score. Alternative variants of the compound computation of the (intermediate) scores p(Ci,t) may be used, wherein the intermediate scores for the scores for the track segments in the time interval [ti−1, ti] are combined in a different way.

Figure 3A:
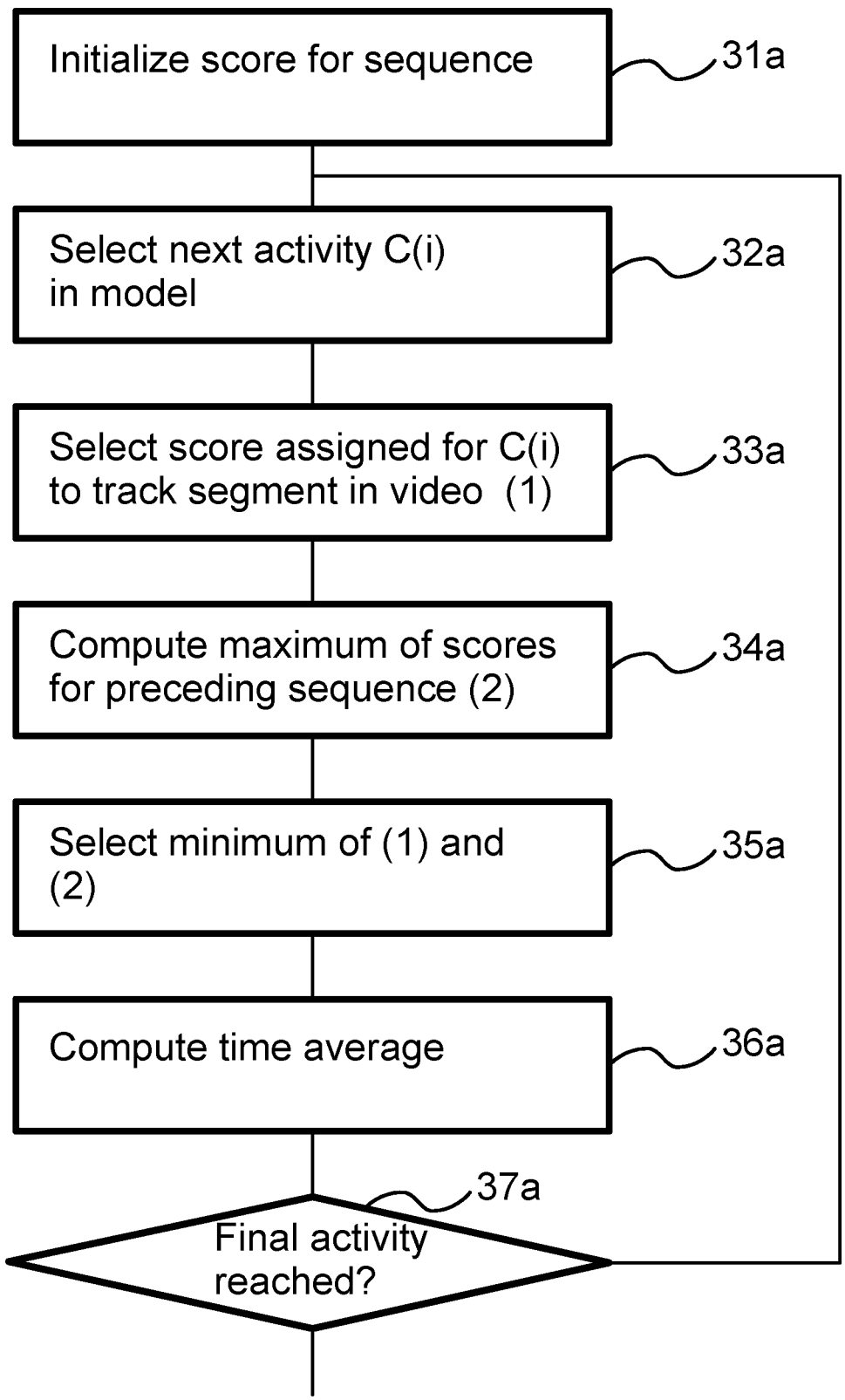
FIG. 3a illustrates an example of computation of a score function

FIG. 3a illustrates a variant of the compound computation for the case of compound activities associated with a single type of activity. In this variant, processing system 12 performs the compound computation of (intermediate) scores p(Ci,t) as a function of time t by computing a time average of an auxiliary function Aux(t'), as a function of starting times t' of the segments in a time interval up to t from t-Ti, where Ti is a duration defined for the compound activity type.

In this embodiment, processing system 12 computes the auxiliary function Aux(t') for each time t' by taking a minimum of (1) the score assigned to the activity type associated with the compound activity type Ci in the segment starting with t' and (2) the maximum of the scores p(Ci−1, t") for the preceding compound activity type Ci−1 over time values t" in a time interval up to a time t" from an initial time $t_o$. Herein the initial time $t_o$ is the time ("Tevent") for which the event score is computed, minus the defined maximum duration T of the event. As will be described, the computation is preferably performed for each of a plurality of actors or sets of actors. But for the sake of explanation the actor dependence will first be left out. This corresponds to a simple embodiment, wherein the score assigned to the activity type may be the maximum of the scores assigned for that activity types to any of the track segments in starting at t'.

By way of example, after performing an initial sub-steps 31a of initializing the score for the sequence, and a sub-step 32a of selecting the first activity i=1 in the sequence, processing system 12 performs a third sub-step 33a of selecting the score assigned to the activity type associated with the compound activity type Ci in the segment starting with t'. These steps are followed by a fourth sub-step 34a wherein processing system 12 computes the maximum of the preceding scores p(Ci−1, t"), a fifth sub-step 35a of computing the auxiliary function by selecting the minimum of the score selected in third sub-step 33a and maximum selected in fourth sub-step 34a. Subsequently processing system 12 performs a sixth sub-step 36a of taking the time average of the auxiliary function over the time interval from t-Ti to t. In an alternative embodiment, the sequence of the fifth and sixth sub-steps 35a, 36a may be interchanged, by first computing a temporal average of the score selected in third sub-step 33a and subsequently taking the minimum of the average and the maximum selected in fourth sub-step 34a. Effectively, this means that the auxiliary function has low (e.g. zero) score value for time values t' for which the track segment have a low score of track segments showing activity types required by the compound activity type. The auxiliary function has the maximum score of p(Ci−,t") from times preceding t' for time values for which the track segment has a high of showing activity of the required type. The effect of taking the time average is that the scores from the latter time values within a time interval of the length Ti defined for the compound activity type accumulate.

For computing p(C1,t), the score assigned to the activity type associated with the compound activity type C1 may used instead of the minimum involving a preceding compound activity type. This comes down to using a default score value instead of the score of the preceding compound activity type. In a first initial sub-step 31, processing system 12 p(C1,t) computes the time average of the score assigned to the activity type for this purpose. In a second sub-step processing system 12 selects the next current compound activity type Ci=C2 of the event model for the sub-steps 33a-36a for computing p(Ci,t).

Processing system 12 may repeat this computation of the score p(Ci,t) for successive compound activities Ci, until it is determined in a seventh sub-step 37a that p(Cn,t) for the final compound activity type defined for the event is available. Thus a compound computation is realized that compounds the scores assigned to track segments into a score p(Cn,t). Processing system 12 uses the score p(Ci,t) to as the event score for Tevent. Similar compound score computations may be used for other types of event.

Tracing Back

In a fifth step 25, processing system 12 selects score p(Cn, t). For example, processing system 12 may search for a maximum of the scores over a time interval from Tevent-T to Tevent and optionally over an event types. Preferably, this furthermore comprises testing whether the maximum exceeds a predetermined threshold and proceeding to a sixth step 26 only if the threshold is reached or exceeded. In an embodiment, processing system 12 is configured to receive a selection of an event type and/or a time interval from a user interface such as a keyboard or a touch screen (not shown) and selects a maximum of the scores p(Cn, t) for an event according to the received selection of the event type and/or the time interval according to the received selection of the time interval.

In a sixth step 26, processing system 12 traces back which track segments contributed to the selected score p(Cn, t). For the variant of the compound computation that is described for fourth step 24, this involves determining, for the final compound activity type Cn, the earliest time point t(n)=t' where in the time interval t-Tn the score assigned to the activity associated with the compound activity type Cn exceeded the maximum of the scores p(Cn−1, t"). For one or more time points in the time interval from t(n) and t, processing system 12 identifies the track segment for the time point or track segments for the plurality of time points to which such a score above max p(Cn−1, t") was assigned for the activity associated with Cn. In the simple example wherein the actor dependence is left out this comprises selecting the track segment that had the highest score for the required activity type for that time point or track segments that had the highest score for the required activity type for those time points.

Figure 3B:
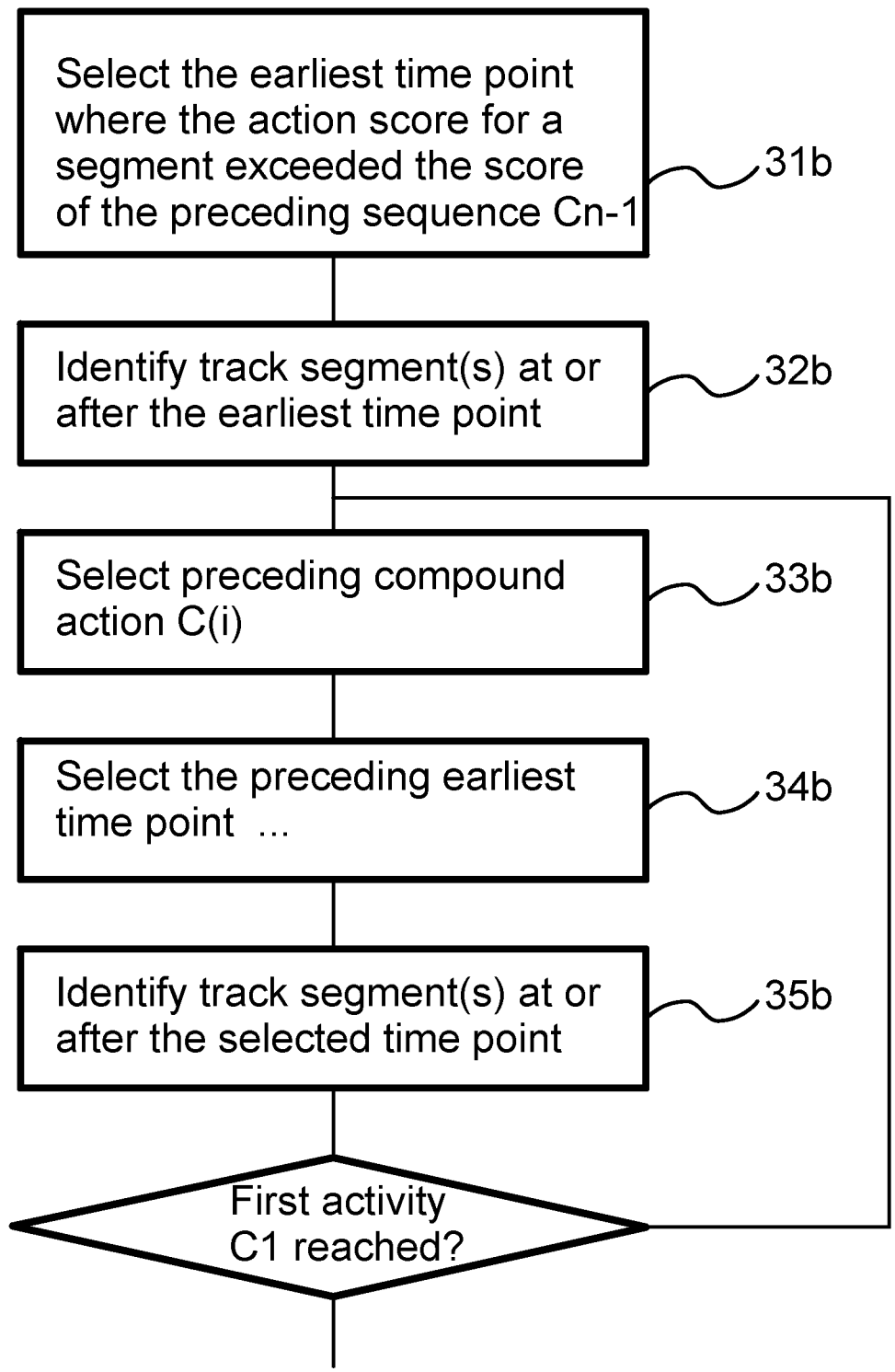

FIG. 3b illustrates tracing back for the variant of FIG. 3a. In a first sub-step 31b processing system 12 determines the earliest time point t(n)=t' where the score assigned to the activity associated with the compound activity type Cn exceeded the maximum of the scores p(Cn−1, t"). In a second sub-step 32b processing system 12 identifies the track segment or track segments for the one or more time points.

Thus, processing system 12 obtains a time value t(n) and one or more track segment identifications in association with the compound activity type Cn as part of the selected event. For example the track segment time point between t(n) and t to which the highest score for the activity associated with the compound activity type Cn was assigned. As other examples the segment for time point t(n) or a latest time point where the track segment score exceeds p(Cn−1, t") may be used (typically t). Alternatively a plurality of segments for different time points between and including t(n) and t may be identified where the track segment score exceeds p(Cn−1, t"). If fifth and sixth step 35,a, 36a of FIG.

3a have been interchanged in the computation of the event score, first sub-step 31a may be modified correspondingly, by determining a time interval (or a time point t(n)=t', e.g. the earliest time point), where the average score assigned to the activity associated with the compound activity type Cn exceeded the maximum of the scores p(Cn−1, t"). Subsequently, processing system 12 performs similar operations for the preceding activities Ci (i=n−1, n−2, . . . ), each by determining, for the compound activity type Ci, the earliest time point t(i)=f where in the time interval t(i+1)-Ti the score assigned to the activity associated with the compound activity type Ci exceeded the maximum of the scores p(Ci−1, t"). For one or more time points in the time interval from t(i) and t(i+1), processing system 12 identifies the track segment or track segments to which such a score above max p(Ci−1, t") was assigned for the activity associated with Ci. For C0 the score assigned to the activity associated with the compound activity type C0 between t-T and t(2) may simply be selected. If fifth and sixth step 35,a, 36a of FIG. 3a have been interchanged in the computation of the event score, this may be modified correspondingly as described for first step 31b.

In a third sub-step 33b processing system 12 selects the preceding compound activity Ci=Cn−1. In a fourth sub-step 34b determines the earliest time point t(n)=t' where the score assigned to the activity associated with the compound activity type Ci exceeded the maximum of the scores p(Ci−1, t"). fifth sub-step 35b processing system 12 identifies the track segment or track segments. If C1 has not been reached, processing system 12 repeats from third sub-step 33b.

Thus, in sixth step 26, processing system 12 obtains a set of combinations (t(i),S(i)) of a time value t(i) and a track segment identification or set of track segment identifications S(i) in association with the compound activity type Ci as part of the selected event for each compound activity type Ci defined in the model of the event. Effectively, sixth step 26 produces a filter output that corresponds to a filtered selection from the input video sequence. under control of the preceding steps, in sixth step 26 processing system 12 performs a filter operation that passes (indications of) selected parts from the input video sequence, in terms of selected track segments of moving image parts in the input video sequence.

In a seventh step 27, processing system 12 generates the output image or an output video sequence based on the combinations of time values t(i) and track segment identifications S(i) found for the compound activities Ci. Effectively, in seventh step 27 processing system 12 uses the filtered selection to produces an output image or an output video sequence based on the filter output of sixth step 26, to which processing system 12 may add background context from parts of the input video sequence that did not pass the filter, distinguished from parts of the input video sequence that did pass the filter.

Figure 5A:
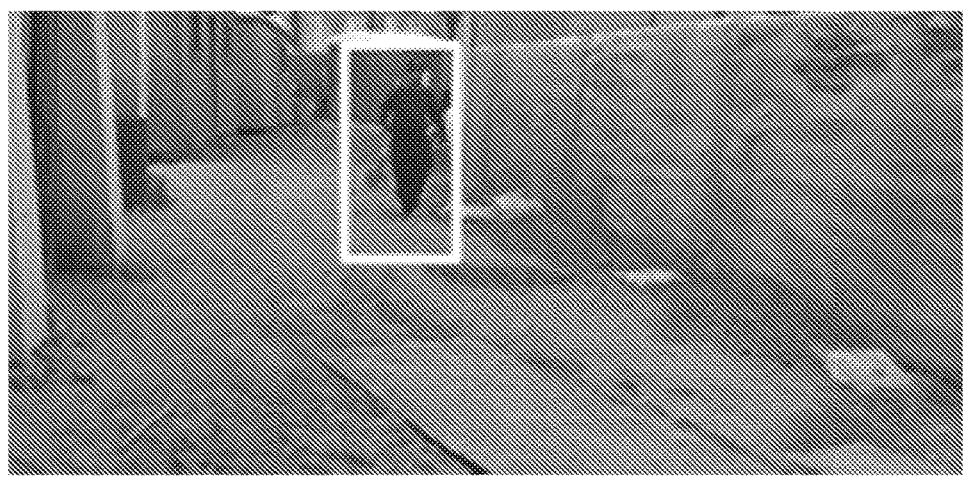
FIG. 5a-c show an example of a filtering result
Figure 5B:
Figure 5C:

FIGS. 5a-c show an example of a filtering result of filtering an input video sequence wherein an object is buried. The filtering result comprises three selected images, corresponding to three successive activities defined by the model, with added highlighting to show image areas that contain the moving image parts from which tracks were selected by tracing back through the compound computation.

It should be noted that FIGS. 5a-c illustrate only one form of filter result. For example, processing system 12 may generate the output video sequence by processing the input video sequence to highlight the object that was tracked or the objects that were tracked to obtain the identified tracks. By way of example, highlighting may comprise increasing reducing pixel luminosity, contrast and/or color saturation of an image area that contains pixels belonging to the objects of the identified track part or parts relative to those not belonging to the objects of the identified track part or parts (by increasing the pixel luminosity, contrast and/or color saturation of the former and/or reducing those of the latter). As another example, a border line of pixels with a distinguishing color or intensity may be added in the video sequence around image areas that contain the objects of the identified track part or parts. As another example, highlighting may comprise showing only selected (moving) image areas associated with the selected track segments.

As another example, processing system 12 may use the time values t(i), or time values between the time values t(i) to select key frames and process the key frames to highlight the objects of the identified track part or parts. In another example, processing system 12 may replicate snapshots of the object or objects of the identified track part or parts from video images for different time points to a key frame. Snapshots from the selected key frames may be used for example.

In an embodiment processing system 12 provides an indication of the score values obtained for the event or the selected track parts, for example by displaying these score values as numbers or by varying the degree of highlighting (e.g.).

In an eight step 28, processing system 12 causes display device 14 to display the output image or an output video sequence.

In another embodiment the filtered output may be replaced by a mark-up version of the input video sequence, wherein highlighting has been added based on the combinations of time values t(i) and track segment identifications S(i) found for the compound activities Ci.

Actor Roles

As noted, the compound activity types may each define a plurality of activity types, e.g. each of a different actor. Actor consistency is preferably imposed for this, but for the sake of explanation the actor consistency will first be left out. In this case, the example of fourth step 24 may be modified for example by computing the auxiliary function Aux(t') for each time t' by taking a minimum of (1) any of the scores assigned to the different activities associated with the compound activity type Ci in the segment starting with t' and (2) the disclosed maximum of the scores p(Ci−1, t").

Effectively, this means that the auxiliary function has low (e.g. zero) score value for time values t' for which the track segment do not have a high score of showing all of the activity types associated with the defined compound activity type.

In this case sixth step 26 may be modified to select for each compound activity type Ci, the earliest time point t(i)=f where in the time interval t(i+1)-Ti the score assigned to all activities associated with the compound activity type Ci exceeded the maximum of the scores p(Ci−1, t"). For one or more time points in the time interval from t(i) and t(i+1), and for all of the activities associated with the compound activity type Ci, processing system 12 identifies the track segment or track segments to which such a score above max p(Ci−1, t") was assigned for the activity associated with Ci. In terms of the illustration of FIG. 3a this may be implemented by amending first sub-step 31a and third sub-step 33a. In third sub-step 33a the minimum of the scores assigned to the different activities associated with the compound activity type Ci may be selected. In first sub-step 31a an average of such a minimum of the scores assigned to the different activities associated with the compound activity C1 may be selected.

Thus, in sixth step 26, processing system 12 obtains a set of combinations (t(i),S(i)) of a time value t(i) and a track segment identification or set of track segment identifications S(i) in association with each of the activities associated with the compound activity type Ci as part of the selected event for each compound activity type Ci defined in the model of the event. These may used for highlighting objects of the identified track part or parts as described for seventh step 27.

As noted, each activity is preferably consistently associated the same actor. Furthermore, the event model may specify that specific activities from different compound activities are performed by the same actor. This will be called actor consistency. Processing system 12 may enforce actor consistency in the computation of fourth step 24 by computing scores p(Ci,m,t) for a plurality of different identifiers m of actors instead of the scores p(Ci, t). In the compound computation of the scores the auxiliary function Aux(t') may be replaced by an actor dependent auxiliary functions Aux(m,t') for different actor identifications m. In this embodiment, processing system 12 computes the auxiliary function Aux(m,t') for each time t' by taking a minimum of (1) the score assigned to the activity associated with the compound activity type Ci in the segment associated with the actor m and starting with t' and (2) the maximum of the scores p(Ci−1, m, t") for the preceding compound activity type Ci−1 over time values t" in a time interval up to a time t" from an initial time to.

In terms of the illustration of FIG. 3*a* this may be implemented by amending first sub-step 31*a* and third sub-step 33*a*. In third sub-step 33*a* the minimum of the scores assigned to the different activities associated with the compound activity type Ci for the actor m for which the compound computation is performed may be selected. First sub-step 31*a* may be similarly amended.

In this embodiment the fifth step 25 of FIG. 2 is modified in that processing system 12 may also select an actor m that results in the highest score p(Cn,m,t), or that processing system 12 uses a selection of an actor for which processing system 12 has received a selection from the user interface. Subsequently, processing system 12 traces back the computation for the selected actor. The process illustrated in FIG. 3*b* may be used, replacing the role of p(Ci,t) by p(Ci,m,t)

When the event model defines activity types of a plurality of actor roles, scores p(Ci,M,t) may be computed, each for a different combinations of actors M={m1, m2, . . . } corresponding to the plurality of actor roles. Auxiliary functions Aux(M,t') for the different combinations may be computed. In this case the minimum is taken of (1) the scores assigned to the activities, if any, of the compound activity type Ci in the segments starting with t' that are associated with the respective actors m associated with the different actors in the combination of actors M and (2) the maximum of the scores p(Ci−1, m, t").

In this embodiment the fifth step 25 of FIG. 2 is modified in that processing system 12 may also select an actor combination M that results in the highest score p(Cn,m,t), or that processing system 12 uses a selection of one or more actors for which processing system 12 has received a selection from the user interface. Subsequently, processing system 12 traces back the computation for the selected actor. The process illustrated in FIG. 3*b* may be used, replacing the role of p(Ci,t) by p(Ci,M,t).

Figure 4:
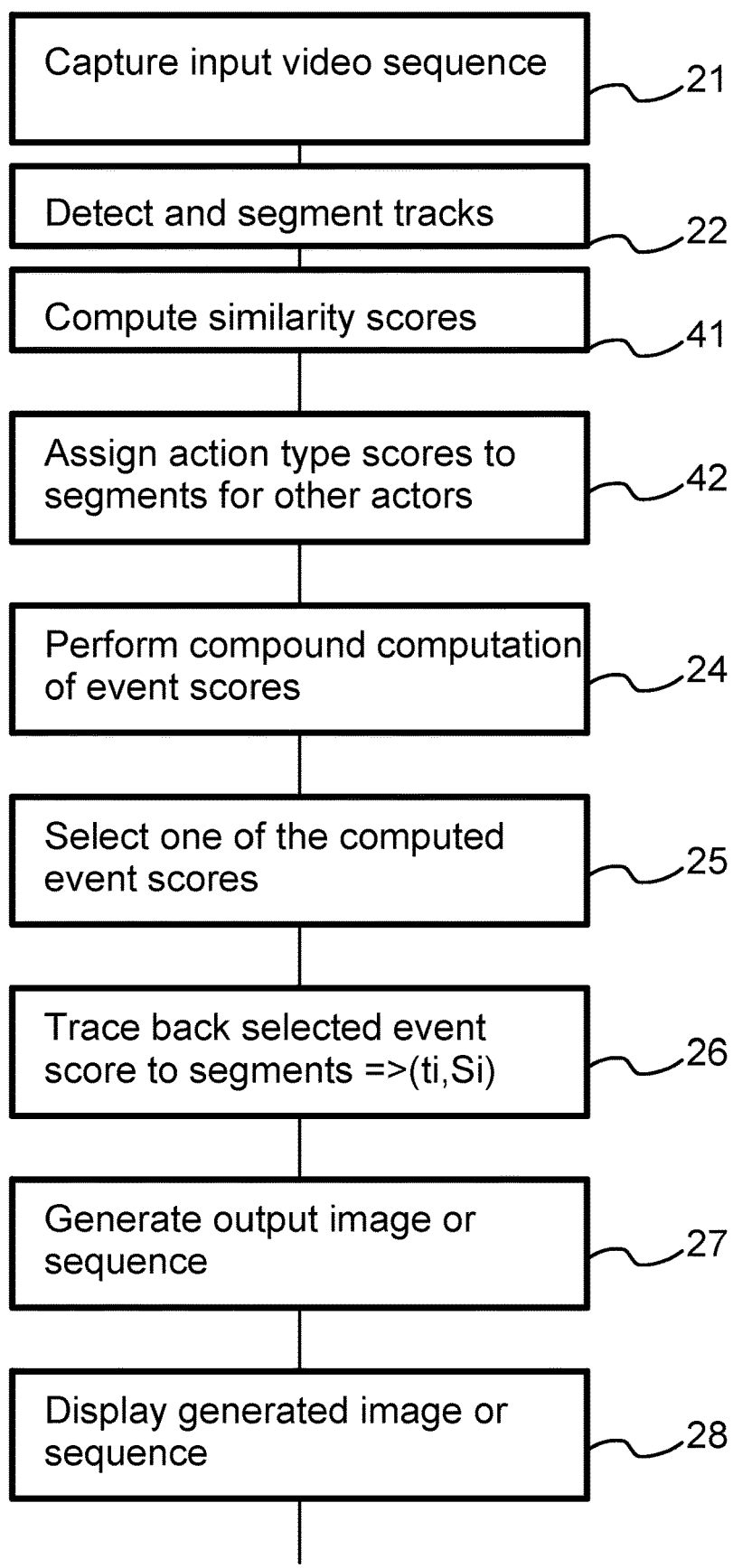
FIG. 4 shows a flow chart of a method of automatically marking up video data

In the preceding embodiments definite actor identifications in are used for track segments. Instead scores for actor identifications may be used. This is illustrated in the flow chart of FIG. 4, in which a first additional step 41 of computing actor similarity scores for track segments has been added to the steps of FIG. 2.

Processing system 12 may be configured to compute actor similarity scores for pairs of track segments, by computing similarity scores for the moving image parts (objects) that are associated with the track segments and/or scores for spatial compatibility of the tracks. A similarity score may be computed e.g. by applying histogram comparison to histograms of the moving image areas, by computing correlation coefficients between the image areas or image data derived from the image areas.

Instead of third step 23, processing system 12 executes a second additional step 42 wherein it computes activity type scores for different actors for the starting time t of a segment, for example by computing products of the activity type scores for each of the track segments with starting time t with a factor dependent on the actor similarity score or scores between the track segment and one or more preceding track segment to which an actor m has been assigned. Processing system 12 then selects the track segment that results in the maximum product at the time t for the actor m as the track segment at the time t for that actor in.

In the subsequent part of the process, processing system 12 may use the selected maximum products instead of the scores assigned to the activities for the actor m in the process of FIG. 2. Thus, in sixth step 26 of the process of FIG. 4, processing system 12 will select time points and maximum products in association with compound activity types instead of time points and track segments. Based on the selected product selected by tracing back, processing system 12 executes a third additional step 43, wherein it selects the track segment that was used to obtain the product. This selected track segment may be used in the subsequent steps in association with compound activity type and the time point. Although specific embodiments have been described, it should be appreciated that the invention is not limited to these embodiments. In general terms, the processing system filters relatively short track segments (e.g. between 1-5 seconds long) of moving image parts from a video sequence. The track segments that are passed by the filtering may be temporally concurrent, i.e. more than one selected track segment may be present in the same image from the video sequence. Moreover, there may be, and there usually are, temporal gaps between the track segments that are selected by the filtering. The result of the filtering may be used to generate of the output video sequence or output video image.

The filter output ultimately depends on properties of the movement and/or position along the tracks in a combination of the track segments and optionally on consistency between moving image parts of which the different track segments describe the motion. The way in which the filtering depends on the combination is controlled by the event model(s), which defines the structure of the filter operation. The filter operation involves a model based computation of event scores, selection of one of the computed event scores based on a comparison between the event scores and tracing back through the compound computation to determine the track segments that contributed to the compound computation of the selected event score.

In the compound computation has successive stages according to a predefined sequence of compound activity types, each stage combining a score from a previous stage and scores assigned to track segments for activities defined in the compound activity type, except that the first stage uses only scores assigned to track segments for activities defined in the compound activity type (effectively combined with a default instead of a score from a previous stage).

Herein the compound activity types each define one or more concurrent activity types, a duration for the compound activity type and preferably the actor roles associated with the different activity types. Each activity type is associated with a respective way of determining a score from the motion and/or position in track segments.

The processing system 12 detects tracks of objects corresponding to moving parts in the input video sequence from a camera, segments the tracks into track segments and assigns scores for activity types to the track segments, according to the way of doing so for the respective activities. Preferably the processing system 12 associates the track segments with actor identifications for indicating which track segments for different time segments show the same object. Alternatively the processing system 12 may compute similarity scores that indicate how similar the moving image area of which the track segment describes the motion is to the moving image area of tracks in different time segments.

The predefined sequence of compound activity types may be said to be part of an event model that defines a series of temporally sequential compound activity types and a maximum time duration for the event. Preferably, the event model also defines a set of one or more actor roles involved in the event.

From the assigned scores for activity types of the detected tracks, and optionally the associated actor identification or actor similarity scores, the processing system 12 performs the compound computation.

This involves a model guided compound computation of event scores, wherein the event score can be traced back to selected track segments. In the model guided compound computation has successive stages according to a predefined sequence of compound activity types, each combining a score from a previous stage and scores assigned to track segments for activities defined in the compound activity type.

By way of example, a variant of such a model guided compound computation has been described, wherein the processing system uses successive stages to perform the compound computation of the event scores, according to a predefined sequence of compound activity types.

In a further embodiment, the method may be used to train the method of computing the activity type scores for the segment. For example, a user may be prompted to indicate whether the track segments that are selected by tracing back may be used as reference tracks for an activity type used in the model. Specific types of tracks that correspond to an activity may occur rarely, which makes it impossible to account for all types of tracks in advance and cumbersome to search for examples that may be used for training. The filtering method makes it possible to find such tracks efficiently.

For many types of data analytics, often the interesting events in the data are rare, e.g., a military threat, a security incident, etc. A problem with rare events is that there is limited or no training data. This makes it hard, if not impossible, to learn a model about the event of interest. The disclosed a method, termed Sequence Finder, enables a user to model rare events from scratch, and to update the event model based on user feedback during run-time. Sequence Finder models long-term events as a sequence of activities, each performed by a subject, i.e., an actor. Multiple actors can be involved. The proposed method is formulated as a probabilistic algorithm, which makes it robust to noise in the data and partial observability of the data. Sequence Finder operates in real-time on a data stream to detect events. For many types of data analytics, often the interesting events in the data are rare, e.g., a military threat, a security incident, etc. In this paper, we consider events that are a sequence of activities by a single or multiple actors, i.e., the subjects who are performing the activities. For instance, a military threat where a person first walks, then loiters, buries an IED into the road, and walks away from the scene. Or, a thief who is loitering to spot a victim, then walks towards the victim, steals a bag, and walks away. Or, somebody approaching a safe-house and is refused entry. Very interesting events indeed, rare in practice, and little is known a-priori about the variations of such an event in the future—which makes it hard to model such events adequately.

One problem with rare events is that there is limited training data, or even no training data at all. This makes it hard, if not impossible, to learn a model about the event of interest. A model can be defined by the expert, but it is hard to predict new variations of the event and all variations of the background. As a consequence, fixed models of a rare, varying event will be inaccurate. For instance, with the earlier example of the burying something into the ground: it may turn out that other types of shovels are used, which has an effect on the way of burying, or that during the burying is performed by two persons instead of one person. The fixed model will produce false positives, when a novel instance of the background looks unexpectedly like the event. And, it will produce false negatives, when a new instance of the event looks unexpectedly like the background. A fixed model is not suitable for events of which the variations are a-priori unknown.

We propose a method, coined Sequence Finder, which enables a user to model rare events from scratch, and to update the event model based on user feedback during run-time. Sequence Finder models long-term events as a sequence of activities, each performed by an actor. Multiple actors can be involved.

The proposed method may be formulated as a probabilistic algorithm, which makes it robust to noise in the data and partial observability of the data. An embodiment of the algorithm is detailed in a section about an embodiment of the new sequence finder. Sequence Finder operates in real-time on a data stream to detect events. This is demonstrated in a section about implementation.

Related Work

Earlier methods have also modeled events as sequences. Finite-state machines (FSM) have been successfully used for the detection of events in a surveillance setting. Yet, a FSM such in [1] encodes the transitions between states as binary switches, which does not make use of the potential of probabilistic reasoning. An elegant form of probabilistic reasoning was proposed in [2] by using a stochastic grammar, specifying the events of interest. Its measurements were performed by hidden Markov models (HMM) on tracks. Elegantly, the HMMs and the grammar were fully integrated into a single algorithm. The method relied on the assumption that the only errors of the tracking were due to track breaks. As a consequence, it was not robust to other errors, such as track overtaking, which seriously hinders the reasoning about events. Cutting tracks into smaller tracklets could solve this, but the method was not able to deal with such an amount of combinatorics in a reasonable amount of time. Recently, a sentence grammar was proposed [3], with a sophisticated framework to track simultaneously object detections, the propositions on these objects, and the grammar specifying the events. Yet, there is no explicit encoding of actor consistency, only implicitly by tracking. Therefore, the method is not dealing with occlusion explicitly.

Embodiment of the New Sequence Finder

Sequence Finder is our novel algorithm to detect user-defined, adaptable, events. It needs to combine activities, actors, interactions, locations, and durations. It needs to be able to enforce actor consistency, while at the same time also dealing with partial observability of the data. For instance, in video data, the actor may be occluded for some time, by another actor or an object in the scene. Also, Sequence Finder needs to deal with uncertainties in the data points, i.e., the dataset instances, such as measurement errors. Such uncertainties will be inherent to the activity representations, the actor characterizations, and the temporal durations. Finally, it needs to deal with the temporal variations of and between the activities. Sequence Finder is able to analyze and detect events in real-time.

Embodiment

In the first step, all data points are visualized in an interface, through a generative representation which is embedded in a 2D view. For instance, for video data, the data points may be tracks of persons in the video, which are visualized by a snippet image of the track (an implementation and example are provided in Section 4). In the 2D view, the user can assign which data points are associated with activities of interest. The activity clusters can then be are labeled by the user, in order to assign meaning to the data points. The rationale is that the assignment is very selective, far from complete, because the user will not have time to assess all data points. The user can limit this assignment to activities of interest, i.e., positives. A discriminative model is trained from the various labeled activities (the positives) and their data points. At any point in time, this activity model can be updated by assigning new data points to an existing activity or a new activity. For instance, for a new way of burying, the activity model can be extended. In the same way, data points can be removed, if they are not occurring anymore, or have become irrelevant. A new activity model will be created based on the modified set of assignments.

In a second step, an event is defined by the user, by formulating it as a sequence of activities, each with an expected time duration. Possibly there are multiple actors involved, each performing particular activities (this is detailed later). The general form of the definition of an event Ei is, E: $\{C1(t1) \rightarrow C2(t2) \rightarrow \ldots \rightarrow Cq(tq), T\}$, where '$\rightarrow$' indicates sequential ordering, the total duration of the event E is maximally T, and, each Cj is a compound activity of some duration tj, C(t): $\{\{A1, A2, \ldots\}, t\}$, where activity A1 is performed concurrently with activity A2 for a time duration t. An activity A is included in the activity model (see the first step detailed above). As part of the event E, an activity A is defined by A(P,[L]), with P the actor performing the activity. P is a real number indicating the identifier for some future, unknown actor. Optionally, a location L is specified where the activity is taking place, which can either be specific (at a particular location) or relative (approach, leave, etc.).

Note that there is no explicit indication for the maximum duration of individual activities, and for the time difference between consecutive compound activities, as usually both are varying severely. Implicitly they are modeled by confining them, by a maximum total duration of the event. The consistency that one actor first performs one activity and later performs another activity can be specified by the generic actor identifiers. Additionally it should be noted that the scope if this method is not only confined to activities relating to individual behavior events; such as burying, running, walking, etc.; it can also be evaluated around activities involving interactions. These include interactions between different actors or actors and stationary points/objects, as long as these can be mathematically deduced to activity indicators relating to the inclividual actors. Examples of such interaction-based activities are approach, leave and follow.

As an example, the IED event is considered, EIED-2P, where two persons walk towards a road, the burying is performed by one person at the road, while another person is loitering, and both persons walk away. A typical duration of each activity (e.g., 3 or 5 seconds) enforces temporal consistency of the activity observations, where the maximum duration of EIED-2P (60 seconds) enforces that all activities are taking place within a reasonable amount of time. The two-person (2P) IED event definition is, EIED-2P: $\{W2P \rightarrow B2P \rightarrow W2P, 60\}$, with, W2P: $\{\{walk(P1), walk(P2)\}, 5\}$, B2P: $\{\{bury(PLroad), loiter(P2)\}, 5\}$.

The variant with one person (1P) is defined as,

EIED-1P: $\{W1P \rightarrow B1P \rightarrow W1P, 60\}$, with,

W1P: $\{\{walk(P1)\}, 5\}$,

B1P: $\{\{bury(P1,road)\}, 5\}$.

The final example involves an event in which someone approaches an object, in this case a safe-house, but is halted close to the object for a certain time, after which he/she is turned away and leaves. The definition of such a 'entry-refusal', EREF-1P, would be:

EREF-1P: $\{A1p \rightarrow LO1p \rightarrow LE1P\}$, with,

A1p: $\{\{approach(P1,door)\}, 3\}$,

LO1p: $\{\{loiter(P1) \{, 5\}$,

LE1p: $\{\{leave(P1,door)\}, 3\}$.

Computation

Sequence Finder uses a iterative approach to calculate the compound activity probabilities P(Ci) associated with sequence E:

E: $\{C1(t1) \rightarrow C2(t2) \rightarrow \ldots \rightarrow Cq(tq), T\}$.

The computations below are performed for each actor P(E,An) at the current time, Tcur, to validate whether this actor confirms the event E. The probability P(E) is determined by, $P(E) = \mathrm{argmax}[n=\{1 \ldots m\}] P(E, An)$, with m the number of current actors.

The probability P(E,An) is computed iteratively, through the compound activities, Ci, as follows.

Every p(Ci,An) is a temporal signal and computed at every time step over the interval <Tcur-T, Tcur] with Tcur.

The iterations are started by defining p(C0)=1 for all t.

For every next iteration 1 . . . q, the following steps are performed:

Propagate: the propagate step provides the temporal ordering of the activities. It propagates the previous signal u to Tcur by calculating:

$p'(Ci-1, An, t) = \max[t' = \{Tcur-T, \ldots, t\}] p(Ci-1, An, t')$

Merge: merge combine the previous probabilities with the compound activity signal Ci, by calculating:

$f(Ci, An) = \min(p'(Ci-1, An, t), Ci(An, t))$, with Ci(An,t) is the probability of the compound activity Ci performed by actor An at time t. This probability expresses the probability that this actor has performed the compound activity (if specified, with another actor, anchor, at a location). An implementation and example are provided later in the following.

Enforce: enforce temporal consistency of the activity Ci by calculating the temporal average over a time window ti, $$p(Ci,An,t)=\text{mean}[t'=\{t-ti,\ldots,t\}]f(Ci,An,t').$$

After iteration q, the computations are finished for the current actor, An, and time, Tcur. P(E,An) equals, by definition, $$P(E,An)=\text{argmax}[t=\{Tcur-T,\ldots,Tcur\}]p(Cq,An,t).$$

In an alternative embodiment, the sequence of the merge and enforce steps may be interchanged, merging being performed after enforcing, i.e. by computing a temporal average of the compound activity signal Ci(An,t) and taking the minimum of this average and the propagated probability p'(Ci-1,An,t) of the preceding compound activity as a function of time.

Detection

Given the actor Aj that maximizes the probability of the event E, the next step is to derive the maximum probability and corresponding time of the event and its compound activities. This information is relevant feedback to the user for two purposes: to alert for the likely occurrence of an event, and, to explain to the user why the event is likely. With this metadata, the event and its compound activities can be visualized, e.g., with video data, snapshots of the particular times can be shown together with their probabilities. This is important for the user to make a decision. For Aj, the maximum probability for each compound activity, PE(Ci), and its time, tE(Ci), are established within <Tcur-T, Tcur], starting with the last compound activity, Cq, back to the first, C1, and derived from each p(Ci,Aj,t), or p(Ci) in short. For pE(Cq), the last compound activity, the procedure is started as follows, $$\{pE(Cq),tE(Cq)\}=\text{argmax}[t=\{Tcur-T,\ldots,T\}]p(Cq).$$

Iteratively, the following procedure is applied for each pE(Ci), from back, i=q-1, to start, i=1, $$\{pE(Ci),tE(Ci)\}=\text{argmax}[t=\{Tcur-T,\ldots,tE(Ci+1)\}]p(Ci),$$

i.e., the maximum for a previous compound activity is established from the beginning of the buffer to the time of the maximum of the current compound activity.

By design, the probability of the event E is defined as, $$pE(E)=pE(Cq).$$

Example

Figure 6A:
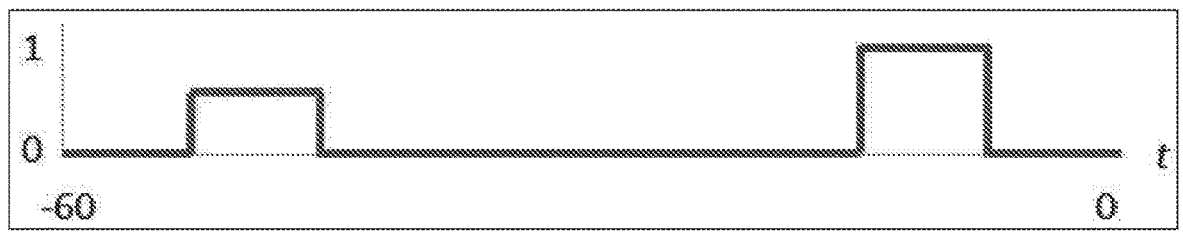
FIG. 6a-n show time dependent score functions
Figure 6B:
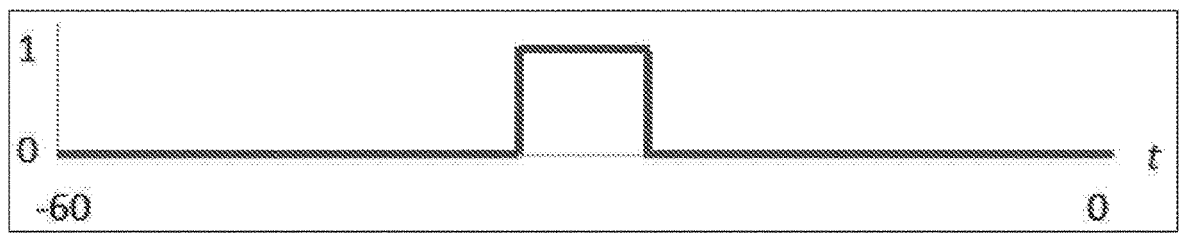

An illustration for all computations and inferences is provided for the event EIED-1P, which is a sequence of walking by one person (W1P), burying of an item (B1P), and then walking away (W1P),

EIED-1P: {[W1P=C1(5)]→[B1P=C2(5)]→[W1P=C3(5)], 60}, where for the current data point, the example signal for W1p(t), within the buffer of 60 seconds is shown in FIG. 6a and, for B1p(t), in FIG. 6b, with time progressing from left to right over a sixty second period. The latest time at the right is t=0 and the earliest time at the left is t=−60 seconds. All of FIGS. 6a-n have corresponding time scales.

Figure 6C:
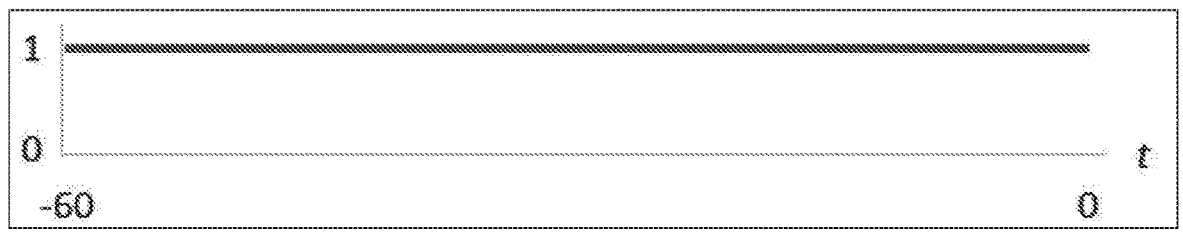
Figure 6D:
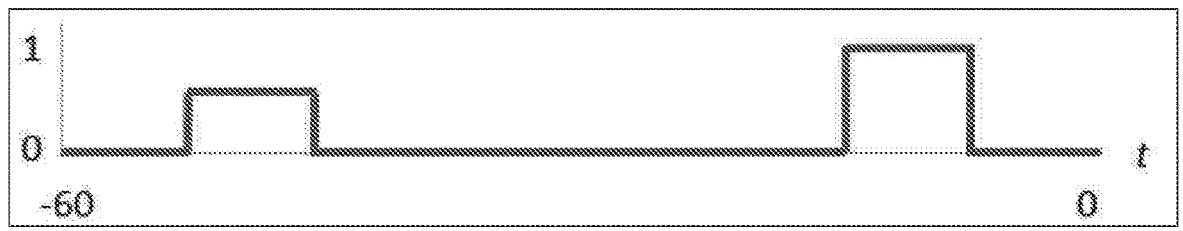
Figure 6E:
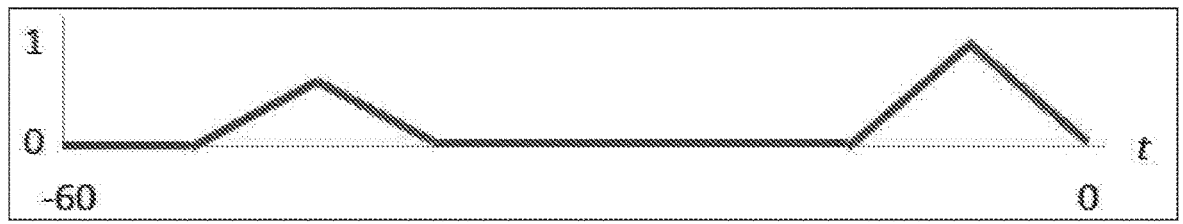
Figure 6F:
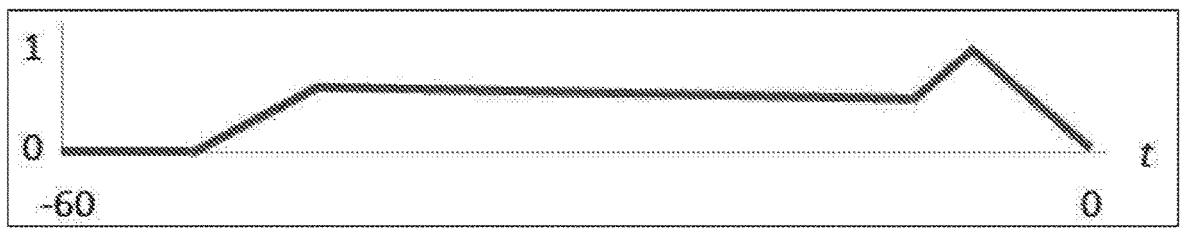
Figure 6G:
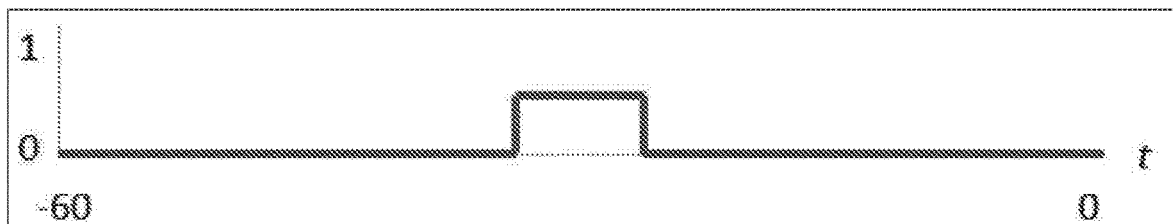
Figure 6H:
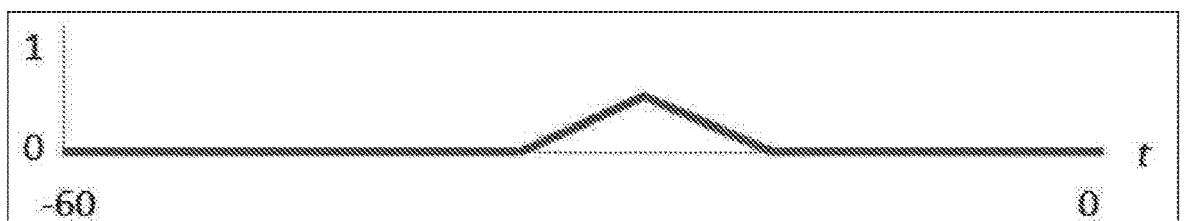
Figure 6I:
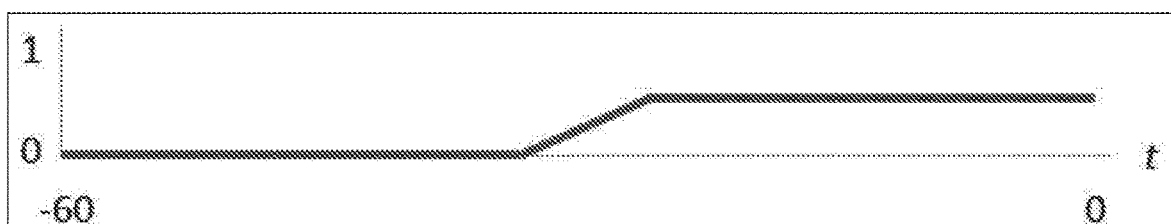
Figure 6J:
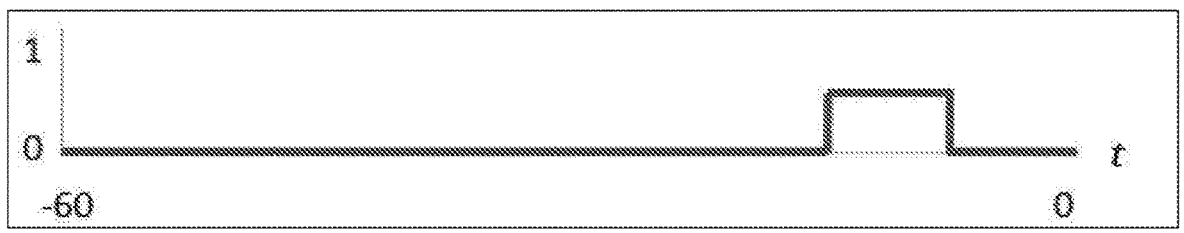
Figure 6K:
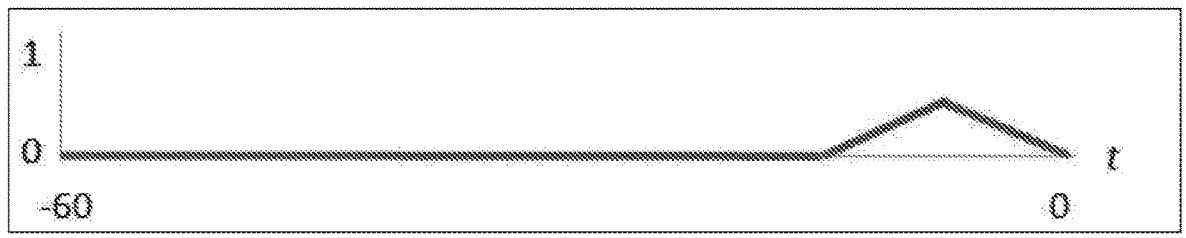
Figure 6L:
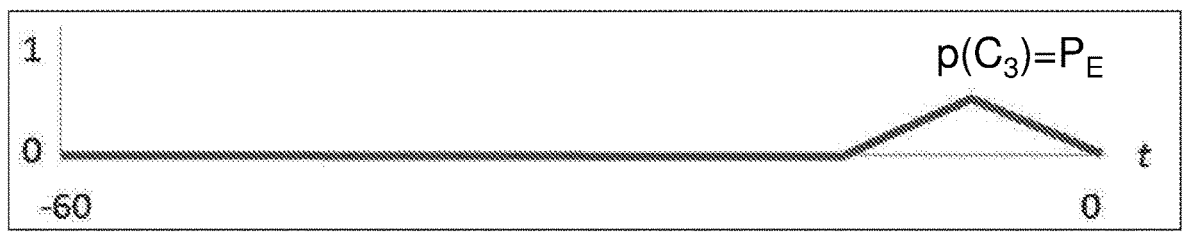
Figure 6M:
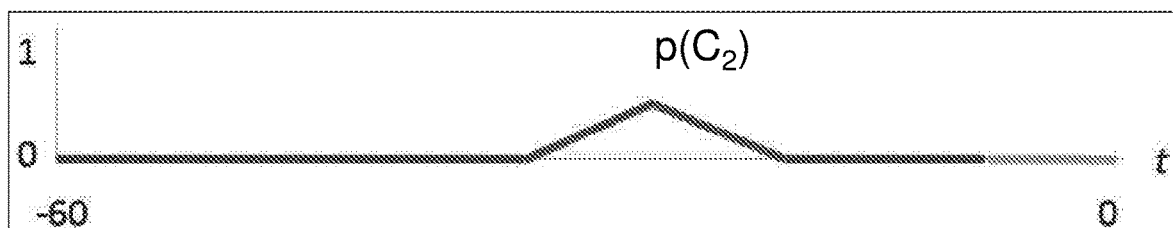
Figure 6N:
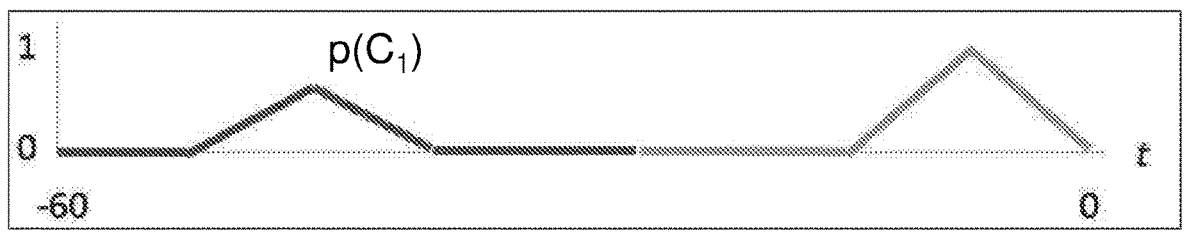

The signal for p(C1) is derived from W1p(t), a duration t1=5 seconds, and p(C0)=1. First, p'(C0) is constructed as shown in FIG. 6c, then, f(C1) as shown in FIG. 6d is constructed. After which p(C1) as show in FIG. 6e is constructed, The next signal p(C2) is obtained likewise, from B1p(t), t2=5 seconds, and p(C1). First, p'(C1) as shown in FIG. 6f is constructed, then, f(C2) as shown in FIG. 6g is constructed, after which p(C2) as shown in FIG. 6h is constructed, Finally, p(C3) is obtained likewise, from W1p(t), again, and t3=5 seconds, and p(C2). First, p'(C2) is as shown in FIG. 6i constructed, then, f(C3) as shown in FIG. 6j is constructed, after which p(C3) as shown in FIG. 6k is constructed, The maximum probability for the event, p(EIED-1P)=pE(C3), and its time tE(C3), is indicated in the FIG. 6l, and, likewise for pE(C2) and tE(C2), as shown in FIG. 6m and, finally, for pE(C1) and tE(C1), as shown in FIG. 6n.

Implementation

In the experiments, an implementation of two events, i.e., EIED-1P and EREF-1P, will be shown, based on data from surveillance videos with rare events, from the Mind's Eye dataset by DARPA (visint.org). The data is obtained by tracking based on detections from a MOD (Moving Object Detection) algorithm [4]. Tracks are cut into small tracklets of one second, to obtain robust short-term observations. Each tracklet is transformed into a data point by adding motion STIP features [5], and storing the pixels at the middle of the tracklet, i.e., a snippet.

Activity Model

The compound activities W1P(P1,t) and B1P(P1,t), part of EIED-1P, are measured by a discriminative activity model which is learned from the tracklets and their motion features, and the accompanied user feedback. The tracklet snippets are embedded through t-SNE [6] The user indicates the snippets of his interest, i.e., positives for walk and bury (see green snippets for bury). The activity model is based on [7], it can be applied to a new tracklet, resulting in a probability for each activity.

Actor Consistency

Figure 7:
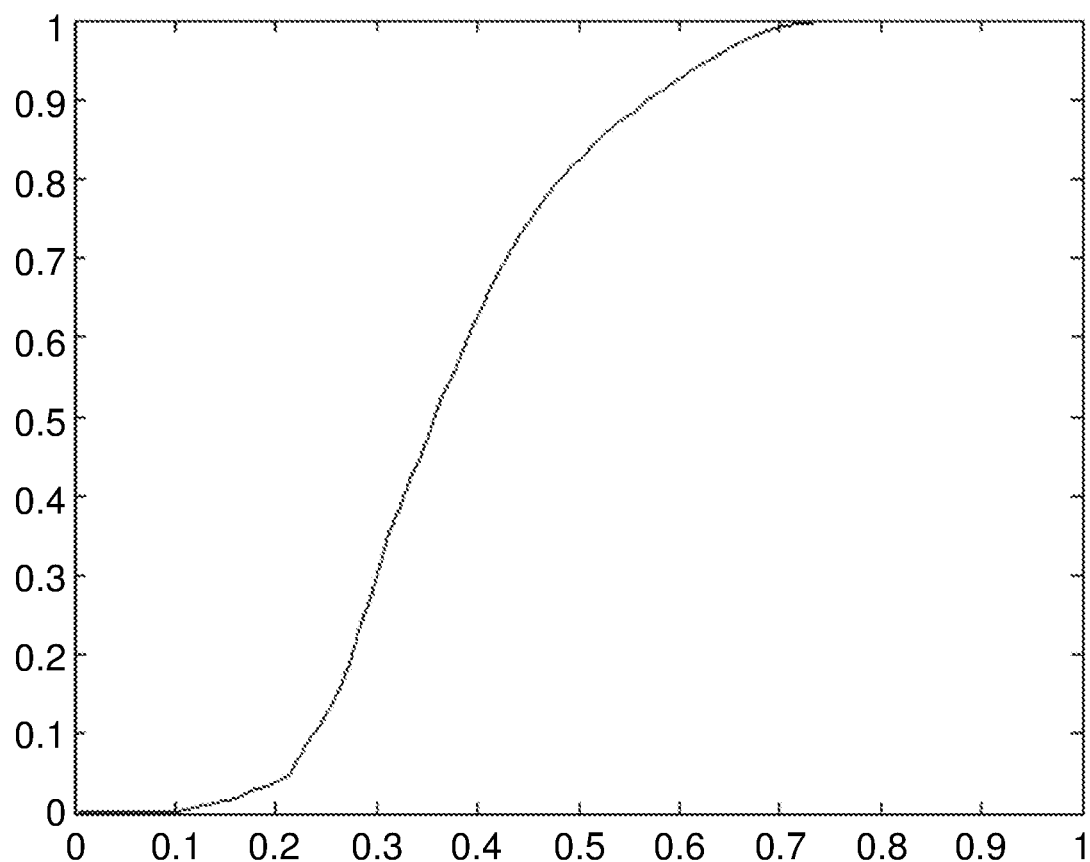
FIG. 7 shows score values as a function of similarity

Actor consistency is assessed by measuring the similarity between snippets [8]. For the current actor that is being analyzed, its snippet is compared to all the tracklet snippets in <Tcur-T, Tcur]. The output is a similarity score. This score is mapped to a probability as shown in FIG. 7, by a mapping obtained through an offline analysis on a large set of tracks. The distributions of scores are investigated across tracks. The mapping is obtained by combining the probability that a similarity score is obtained within the same track versus the probability that this similarity score is obtained for another track. The mapping g produces the probability that actors Aj and Ak are the same based on their snippets S, $$p(Aj=Ak)=g(s(S(Aj),S(Ak))).$$

Interaction Model

Interactions between different actors and additionally annotated objects are modeled by decomposing each actors' world-coordinates in time into instantaneous movement vectors:

$$u(P1,t)=[(xt(P1)-xt-1(P1),yt(P1)-yt-1)(P1))]$$

with x and y the spatial dimensions. Using these vectors allows for interactions to be modelled on the basis of simple vector calculus. For instance, the angle of movement between two actors is calculated by the dot product of their movement vectors, whereas the relative speed is calculated by the temporal derivative of the length of the vector difference between two actors. A prerequisite for such vector-based interaction analysis is the fact that the instantaneous movement vectors are to be mapped from image coordinates to world coordinates. For this purpose, an auto-calibration routine is used thereby mitigating the need for a-priori knowledge of the camera's orientation [9].

Measurement of Ci

For each of the tracklets at the current time, the Sequence Finder is applied to verify the event. It involves the following measurements of the signals of the compound activities Ci, which are needed for the computations from the section on computation. For a current actor An, a signal Ci(An,t) combines its activity and actor probabilities from recent observations within <Tcur-T, Tcur], $Ci(An,t)=\text{argmax}[Aj \text{ at time } t]ci(An,Aj,t),$ with Aj the actors at time t, and, $ci(An,Aj,t)=\text{pactor}(An=Aj)*\text{pactivity}(Aj,i,t),$ i.e., a combination of the probabilities that Aj is the same actor as An and that Aj performed the $i_{th}$ compound activity at time t. For simplicity of computations, independence is assumed between actor and activity (i.e., a multiplication).

Next, the Sequence Finder can analyze the current tracklet, with Ci and the computations from the section on computation, in order to verify whether it confirms the event of interest. This is performed for all current tracklets, after which the maximum is taken, and a detection may be produced (see the section om detection) when a pre-specified threshold is exceeded.

Applying the Sequence Finder

The Sequence Finder is applied to detect EIED-1P (see earlier definition) within the DARPA video SH1_01-05, camera 1 (C1), from the visint.org dataset, producing the filtering result of FIG. 5a-c. A man is detected, who first was walking and preparing, then started to bury an item into the ground, and finally he walked away.

The Sequence Finder detected in the same vising.org dataset, on another video SH1_01-05, camera 2 (C2), the event EREF-1P. Its compound activities are derived from interactions with the safe-house. The door of the safe-house was annotated as an interacting object. The detection of this 'refused-entry' event (seethe section on specification) is shown in FIG. 5. First a man is detected approaching the door after which he is held up by the guards resulting in a period of effectively 'loitering' near the door, after which he is turned away resulting in a leaving motion.

We have proposed Sequence Finder, an algorithm that models long-term events as a sequence of activities, each performed by an actor. Multiple actors can be involved. The proposed method has been formulated as a probabilistic algorithm, which makes it robust to noise in the data and partial observability of the data. Sequence Finder operates in real-time on a data stream to detect events. On video data, the proposed method has been shown to adequately detect a rare event, given a specification of a sequence of activities performed by a single actor, based on simple tracker and motion features.

REFERENCES

[1] A. Fernández-Caballero, J. C. Castillo, J. M. Rodríguez Sanchez, Human activity monitoring by local and global finite state machines, Expert Syst. Appl. 39, 6982-6993, 2012.

[2] G. Sanromà, L. Patino, G. J. Burghouts, K. Schutte, J. Ferryman, A unified approach to the recognition of com-plex actions from sequences of zone-crossings, Image and Vision Computing 32, 363-378, 2014.

[3] D. P. Barrett, A. Barbu, N. Siddharth, and J. M. Siskind, Saying What You're Looking For: Linguistics Meets Video Search, IEEE Transactions on Pattern Analysis and Machine Intelligence (PAMI), 28(10), 2069-2081, 2016.

[4] J. Xiao, H. Cheng, H. Sawhney, F. Han, Vehicle Detection and Tracking in Wide Field-of-View Aerial Video, IEEE CVPR, 2010.

[5] I. Laptev, T. Lindeberg, Space-time interest points, IEEE International Conference on Computer Vision, vol. 1, 2003, pp. 432-439, 2003.

[6] L. J. P. van der Maaten and G. E. Hinton, Visualizing High-Dimensional Data Using t-SNE, Journal of Machine Learning Research 9, 2579-2605, 2008.

[7] G. Burghouts, K. Schutte, H. Bouma, R. Hollander, Selection of negative samples and two-stage combination of multiple features for action detection in thousands of videos, Mach. Vis. Appl., 1-14, 2013.

[8] H. Bouma, J. Baan, S. Landsmeer, C. Kruszynski, G. van Antwerpen, J. Dijk, Real-time tracking and fast retrieval of persons in multiple surveillance cameras of a shopping mall, Proc. SPIE, vol. 8756, 2013.

[9] R. den Hollander, H. Bouma, J. Baan, P. Eendebak, J van Rest, Automatic inference of geometric camera parameters and inter-camera topology in uncalibrated disjoint surveillance cameras, Proc. SPIE, Vol. 9652, 2015.

The invention claimed is:

1. A method of filtering an input video sequence captured by a camera, the method comprising
detecting temporal tracks of moving image parts from the input video sequence;
assigning activity scores to temporal segments of the tracks, using respective predefined track dependent activity score functions for a plurality of different activity types;
computing event scores as a function of time, said computing being controlled by a definition of a temporal sequence of activity types or compound activity types for an event type, said computing of the event scores comprising computing successive intermediate scores, each as a function of time for a respective activity types or compound activity types in the temporal sequence, the event score corresponding to the intermediate score of a final activity types or compound activity type of the temporal sequence, the successive intermediate scores for each respective activity types or compound activity types being computed as a function of time from a combination of
the intermediate score for a preceding activity type or compound activity type in the temporal sequence at a preceding time and
activity scores that were assigned to segments of the tracks after the preceding time, for the activity type or activity types defined by the compound activity type defined by the respective activity types or compound activity types in the temporal sequence,
selecting one of the computed event scores for a selected time;
tracing back the computation of the selected event score to identify intermediate scores that were used to compute the selected one of the event scores and to identify selected segments of the tracks for which the assigned activity scores were used to compute the identified intermediate scores;

generating an output video sequence and/or video image selectively including the image parts associated with the selected segments.

2. The method according to claim 1, comprising
associating actor identifiers with the track segments, the actor identifiers relating track segments with a same assigned actor identifier at different time points;
performing said computing of event scores for each of a plurality of assigned actor identifiers, the activity scores used in said computing being activity scores that were assigned to segments of the tracks associated with the assigned actor identifier;
said selecting one of the computed event scores comprising selecting said one of the computed event scores for a pre-selected actor identifier.

3. The method according to claim 2, comprising
computing similarity scores between the moving image parts of the track segments for different time segments;
the activity scores for each track segment being assigned by computing a product of the respective predefined track dependent activity score functions and a factor dependent on the similarity score between the moving image parts of the track segment and of one or more preceding track segments.

4. The method according to claim 3, wherein the one or more preceding track segments comprise track segments used to compute the intermediate score for the preceding activity type or compound activity type in the temporal sequence at the preceding time.

5. The method according to claim 1, wherein the definition associates a plurality of different actor roles with different activity types in at least a plurality of the compound activity types in the temporal sequence and the definition relates the actor roles between the compound activity types in said a plurality of the compound activity types; the method comprising
associating actor identifiers with the track segments, the actor identifiers relating track segments with a same assigned actor identifier at different time points;
performing said computing of event scores for each of a plurality of combination of assigned actor identifiers assigned to the actor roles, the activity scores used in said computing being activity scores that were assigned to segments of the tracks associated with the assigned actor identifiers;
said selecting one of the computed event scores comprising selecting said one of the computed event scores for a pre-selected combination of actors.

6. The method according to claim 5, comprising
computing similarity scores between the moving image parts of the track segments for different time segments;
the activity scores for each track segment being assigned by computing a product of the respective predefined track dependent activity score functions and a factor dependent on the similarity score between the moving image parts of the track segment and of one or more preceding track segments.

7. The method according to claim 1, wherein said selecting of one of the computed event scores for a selected time comprises comparing event scores for different times and selecting a highest of the compared event scores.

8. The method according to claim 1, wherein said selecting of one of the computed event scores for a selected time comprises comparing event scores for different times and a plurality of different definitions of temporal sequences of activity types or compound activity types and selecting a highest of the compared event scores.

9. The method according to claim 1, wherein said definition of the temporal sequence of activity types or compound activity types for an event type comprises definitions of temporal lengths associated with at least part of the activity types or compound activity types in the temporal sequence, and wherein the computation of the successive intermediate scores for these activity types or compound activity types comprises computing an accumulated activity score by accumulating assigned activity score that were assigned to segments over said temporal lengths before combining the accumulated activity scores with the intermediate score for the preceding activity type or compound activity type.

10. The method according to claim 1, wherein said definition defines a maximum duration of the temporal sequence, and wherein the computation of the event score for a time point is limited to using the activity scores that were assigned to segments that are not more than the maximum duration before the time point for which the event score is computed.

11. A video filtering system, comprising a programmable processing system and a computer program to make the processing system perform the steps of
detecting temporal tracks of moving image parts from an input video sequence;
assigning activity scores to temporal segments of the tracks, using respective predefined track dependent activity score functions for a plurality of different activity types;
computing event scores as a function of time, said computing being controlled by a definition of a temporal sequence of activity types or compound activity types for an event type, said computing of the event scores comprising computing successive intermediate scores, each as a function of time for a respective activity types or compound activity types in the temporal sequence, the event score corresponding to the intermediate score of a final activity types or compound activity type of the temporal sequence, the successive intermediate scores for each respective activity types or compound activity types being computed as a function of time from a combination of
the intermediate score for a preceding activity type or compound activity type in the temporal sequence at a preceding time; and
activity scores that were assigned to segments of the tracks after the preceding time, for the activity type or activity types defined by the compound activity type defined by the respective activity types or compound activity types in the temporal sequence;
selecting one of the computed event scores for a selected time;
tracing back the computation of the selected event score to identify intermediate scores that were used to compute the selected one of the event scores and to identify selected segments of the tracks for which the assigned activity scores were used to compute the identified intermediate scores;
generating an output video sequence and/or video image selectively including the image parts associated with the selected segments.

12. A method of training the video filtering system according to claim 11, comprising providing the definition of a temporal sequence of activity types or compound activity types for the event type, providing training examples of detected tracks or track segments associated with different activity types, the video filtering system executing a score computation training algorithm to train functions for the assigning of the activity scores to temporal segments of the tracks.

\* \* \* \* \*